United States Patent

Schacht et al.

Patent Number: 5,096,777
Date of Patent: Mar. 17, 1992

[54] DOUBLE-SIDED SELF-ADHESIVE TAPE WITHOUT A BACKING

[75] Inventors: Wolfgang Schacht; Christoph Nagel, both of Hamburg, Fed. Rep. of Germany

[73] Assignee: Beiersdorf Aktiengesellschaft, Hamburg, Fed. Rep. of Germany

[21] Appl. No.: 619,778

[22] Filed: Nov. 29, 1990

[30] Foreign Application Priority Data

Dec. 2, 1989 [DE] Fed. Rep. of Germany ....... 3940001
Sep. 21, 1990 [DE] Fed. Rep. of Germany ....... 4029896

[51] Int. Cl.$^5$ .......................... B32B 5/16; B32B 7/12
[52] U.S. Cl. .................................... 428/343; 428/345; 428/354; 428/355
[58] Field of Search ............... 428/343, 345, 352, 354, 428/355

[56] References Cited

U.S. PATENT DOCUMENTS

| | | | |
|---|---|---|---|
| 4,098,945 | 7/1978 | Oehmke | 428/355 X |
| 4,223,067 | 9/1980 | Levens | 428/355 X |
| 4,522,870 | 6/1985 | Esmay | 428/354 X |
| 4,748,061 | 5/1988 | Vesley | 428/355 X |
| 4,818,610 | 4/1989 | Zimmerman et al. | 428/343 X |
| 4,906,421 | 3/1990 | Plamthottam et al. | 264/101 X |
| 4,950,537 | 8/1990 | Vesley et al. | 428/343 X |

FOREIGN PATENT DOCUMENTS

| | | |
|---|---|---|
| 0257984 | 3/1988 | European Pat. Off. |
| 2105877 | 7/1979 | Fed. Rep. of Germany |
| 3103938 | 6/1982 | Fed. Rep. of Germany |
| 2821606 | 10/1984 | Fed. Rep. of Germany |
| 89/00106 | 1/1989 | World Int. Prop. O. |

*Primary Examiner*—George F. Lesmes
*Assistant Examiner*—D. R. Zirker
*Attorney, Agent, or Firm*—Sprung Horn Kramer & Woods

[57] ABSTRACT

Double-sided self-adhesive tape without a backing, consisting of a pressure-sensitive adhesive layer of more than 200 μm in thickness and containing solid glass microspheres of more than 1.5 g/cm$^3$ in density.

15 Claims, No Drawings

DOUBLE-SIDED SELF-ADHESIVE TAPE WITHOUT A BACKING

The invention relates to a double-sided selfadhesive tape without a backing, in particular for permanently bonding articles having uneven patches on the surfaces to be bonded For this purpose, foam sheets have hitherto been used, which are coated on both sides with an adhesive, and which adapt to the uneven patches of the surfaces but which, despite their considerable economic success, have limited applicability in practice precisely because of their foam backing.

Since thicker adhesive layers as such do not solve the problem, it has been proposed either to expand the adhesive composition itself or to give it a microcellular structure. While expansion, due to premature breakdown of the bubbles, does not lead to practicable products, microcellular products are known from German Patent 2,105,877. Such an adhesive strip adapts to irregular surfaces, since certain microcells in the microcellular adhesive layer break down under the local high pressure caused by projections or bulges, while the other undamaged cells remain in the microcellular state (col. 3, 1. 21-27). German Patent 2,821,606 also describes adhesive tapes of this kind, which are distinguished in particular by a lack of elastic recovery after the pressure has been maintained for a certain time (p. 1, 1. 37 and 1. 65). The reason for this is that the surfaces on opposing sides of each cell adhere to one another and prevent a recovery (p. 1, 1. 43/44).

Adhesive tapes of this type are also described in EP-OS 257,984, which tapes have voids or hollow "microspheroids" consisting of non-adhesive thermoplastic polymers (cf. p. 1, 1. 6/7 and p. 2, 1. 15), whose advantages compared with unfilled systems and those containing hollow glass microspheres are pointed out (p. 4, 1. 10-12).

WO 89/00106 also describes foam-like adhesive tapes (introduction p. 1, 1. 17) containing "low-density microspheres" in the backing (p. 3, 1. 15/16). These foam-like adhesive tapes are distinguished by low elasticity (p. 4, 1. 23-25), and thus their basic structural design corresponds to that described above (for example German Patent 2,821,606), in which the "low-density microspheres" reduce the density of the backing (p. 12, 1. 30/31), although, according to p. 13, 1. 1-5, these particles can be compact, hollow or porous and brittle or elastomeric and can be made of glass, ceramic, polymers or a carbon material The density of these "low-density microspheres", including the brittle/solid ones, is less than 1.0 g/cm: (p. 14, 1. 6-8) and gives the adhesive tapes described the desired foam-like character.

However, apart from their unquestioned advantages, these types of adhesive tapes also have a number of disadvantages, which become evident in practical application and also during their manufacture. Thus, hollow glass microspheres are sensitive particles, which can already splinter during storage but especially when incorporated into an adhesive composition, with subsequent problems due to the splinters formed.

Moreover, the voids in the adhesive composition allow penetrating solvents to follow undesirable paths through the tape and allow solvents and water to enter an adhesive joint sideways, for example in practice in the case of automotive molding strips bonded therewith. The nature of these types of foam-like adhesive tapes is such that they do not have the advantages of completely void-free products The object of the invention was to remedy this situation, in particular to create an adhesive tape without a backing which does not have the disadvantages of the prior art or not to such an extent, but nevertheless provides permanent bonds, such as are demanded in particular for bonding automotive molding strips, bumpers and the like.

This object is achieved by self-adhesive tapes, such as are characterized in more detail in the claims.

Comparative investigations on the effects of solid glass microspheres and hollow glass microspheres, dispersed in adhesive compositions, on the adhesive properties of the corresponding adhesive strips surprisingly showed that the use of solid glass microspheres leads to bonds which can be subjected to significantly higher stresses.

The self-adhesive tapes according to the invention can be prepared in a manner known per se. Thus, for example, solid glass microspheres can be dispersed in a copolymer prepared by free radical polymerization and composed of butyl acrylate, iso-octyl acrylate and acrylic acid, which is present as a solution in a mixture of benzine, acetone and isopropanol, after the addition of a chemical crosslinking system. The mixture obtained is brushed onto a surface of low adhesion, from which the adhesive layer can again be easily removed, and dried to give an adhesive layer having a thickness of about 100 $\mu$m.

Three of these layers can be laminated onto one another, while avoiding any inclusions of air and removing the auxiliary backings of low adhesion. Finally, both sides of the now about 300 $\mu$m thick adhesive strip filled with solid glass spheres are analogously coated with one adhesive layer each of the abovementioned copolymer, of about 50 $\mu$m thickness but in which no solid glass microspheres are dispersed and which has a lower content of crosslinking agent. Crosslinking is then carried out in a manner known per se by heat, if desired even by UV irradiation or the like, and finally the product is covered on one side or both sides with a release paper or a release sheet and, if desired, cut and wound to rolls.

Another possibility of producing an adhesive tape according to the invention consists in first removing the solvent from the solution of the adhesive composition which may already have been mixed with solid glass microspheres and pigments, for example by brushing it onto release paper and drying it in a conventional tunnel drier or in an extruder having at least one vacuum zone. The substantially solvent-free composition is then fed into a commercially available extruder. The solid glass microspheres and pigments can then be incorporated via a suitable metering device unless this has already been done before the drying. It is advantageous to provide at least one vacuum zone in the extruder, so that all air inclusions can be removed.

By adjusting the extrusion gap width correspondingly, the intermediate layer of the adhesive tape can be produced in a thickness of about 200-2100 $\mu$m in one step. A favorable procedure for applying the advantageously about 50 $\mu$m thick layers of unfilled adhesive composition on both sides consists in extruding directly onto a release paper already coated with adhesive composition. Thus, the only thing left to do is to cover the open side with another layer. The two unfilled layers of adhesive composition can originate either from a solvent-free coating applied by means of an extruder or from a coating of solvent-containing adhesive composition.

The crosslinking of the adhesive tape can be carried out in an advantageous manner by the abovementioned known methods, but in particular by electronbeam crosslinking In this procedure, it is quite possible to crosslink the intermediate layer filled with solid glass microspheres by an electron beam before applying the unfilled top layers and to crosslink the top layers chemically or, alternatively, the compound structure can be crosslinked by an electron beam. Further crosslinking combinations are also possible

EXAMPLE

A copolymer was prepared by the polymerization procedure of German Patent 1,569,898 (Example 1). Instead of the monomers and parts by weight mentioned there, 460 parts by weight of n-butyl acrylate, 460 parts by weight of 2-ethylhexyl acrylate and 80 parts by weight of acrylic acid were used. The solids content of the copolymer solution obtained was 43%, and the K value of the polymer was 52. 200 parts by weight of isopropanol and 530 parts by weight of a 3% solution of Tyzor AA (from DuPont) in ethyl acetate were added to the solution as crosslinking components.

The procedure for manufacturing a double-sided adhesive tape from the solution of the adhesive composition obtained was as follows:

a) Using a conventional coating apparatus, two different silicone-coated paper backings of higher and lower release effects were brush-coated at a gap width of 0.15 mm. Drying was carried out at 80° C. for 10 minutes. The weight per unit area of the adhesive layer obtained was 50 g/m$^2$.

b) 10 parts by volume (relative to the solid substance) of solid glass microspheres having an average diameter of 0.40 μm (from Potters-Ballotini GmbH) were stirred into the solution of the adhesive composition described above. The mixture was allowed to stand overnight to allow the air bubbles stirred in to escape. The next day, the mixture was stirred at low revolutions until the glass microspheres were again distributed homogeneously. The suspension obtained was brush-coated analogously to the process in a) at a slit of 0.25 mm onto the silicone-coated paper of higher release effect and likewise dried at 80° for 10 minutes An adhesive layer of 80 g/m$^2$ was obtained.

c) Between two rubber rollers heated to 80° C. a brushcoating prepared in b) Was laminated, at a rate of 2 m/min, onto the brush-coating prepared in a) on the paper of lower release effect The paper of high release effect was removed. Analogously, a further three of the brush-coatings prepared in b) were laminated onto the composite obtained. Finally, the brush-coating prepared in a) on the paper of higher release effect was laminated analogously onto the composite, and the entire composite was crosslinked at 130° C. for 15 minutes.

The double-sided adhesive tape thus obtained and covered on both sides and having a thickness of 0.42 mm was cut into strips 20 mm wide. The two covers consisting of silicone-coated paper of different release effect allow without difficulties the removal of the cover of higher release effect without pulling off the adhesive tape from the remaining cover. If the back of the remaining cover was provided with a silicone coating of higher release effect, the strips could be wound to a roll, from which the material could again be unrolled and applied without difficulty.

Excellent values were achieved not only in the shear test but also in other tests.

Accordingly, there is provided a double-sided self-adhesive tape without a backing, comprising a pressure-sensitive adhesive layer more than 200 μm in thickness and containing solid glass microspheres of more than 1.5 g/cm$^3$ in density Advantageously 1 to 50%, in particular 3 to 40% and very particularly 7 to 30%, by volume of the pressure-sensitive adhesive layer comprises the solid glass microspheres which have an average diameter of 10 to 100 μm, in particular 30 to 60 μm, and a density of 1.8 to 7.2, in particular 1.9–4.2, very particularly 2–3, g/cm$^3$.

Advantageously the adhesive layer containing the solid glass microspheres is of the hot-melt type and is crosslinked.

It will be understood that the specification and examples are illustrative but not limitative of the present invention and that other embodiments within the spirit and scope of the invention will suggest themselves to those skilled in the art.

What is claimed is:

1. A double-sided self-adhesive tape without a backing, consisting essentially of an acrylic pressure-sensitive adhesive layer more than 200 μm in thickness and containing solid glass microspheres of 1.8 to 7.2 g/cm$^3$ in density and having an average diameter of 10–100 μm.

2. A self-adhesive tape according to claim 1, of which 3 to 4% by volume comprises such solid glass microspheres having an average diameter of 30–60 μm, and a density of 1.9 to 4.2 g/cm$^3$.

3. A self-adhesive tape according to claim 1, of which 7 to 30% by volume comprises such solid glass microspheres having an average diameter of 30–60 μm, and a density of 2 to 3 g/cm$^3$.

4. A self-adhesive tape according to claim 1, carrying a further pressure-sensitive adhesive layer of 10–100 μm thickness on at least one side of the adhesive layer containing the solid glass microspheres.

5. A self-adhesive tape according to claim 1, carrying a further pressure-sensitive adhesive layer of 20 to 80 μm on both sides of the adhesive layer containing the solid glass microspheres.

6. A self-adhesive tape according to claim 1, carrying a further pressure-sensitive adhesive layer of 40 to 60 μm on both sides of the adhesive layer containing the solid glass microspheres.

7. A self-adhesive tape according to claim 1, wherein the pressure-sensitive adhesive layer comprises a copolymer soluble in an organic solvent, crosslinkable and containing more than 80% by weight of an alkyl acrylate having 4–12° C. atoms in the alkyl chain.

8. A self-adhesive tape according to claim 1, of a thickness of 200 to 2100 μm.

9. A self-adhesive tape according to claim 1, of a thickness of 250 to 1500 μm.

10. A self-adhesive tape according to claim 1, of a thickness of 300 to 800 μm.

11. A self-adhesive tape according to claim 1, wherein the adhesive layer filled with solid glass microspheres is colored with carbon black.

12. A self-adhesive tape according to claim 1, covered on at least one side with a release paper.

13. A self-adhesive tape according to claim 1, covered on both sides with a release paper.

14. A self-adhesive tape according to claim 1, covered on one side with a release paper and wound to a roll.

15. A self-adhesive tape according to claim 2, wherein the adhesive layer containing the solid glass microspheres is of the hot-melt type and is crosslinked.

* * * * *